United States Patent [19]

Sawby

[11] Patent Number: 4,491,216

[45] Date of Patent: Jan. 1, 1985

[54] GRAIN HANDLING SYSTEM

[76] Inventor: Kenneth J. Sawby, Box 520, Maplecreek, Saskatchewan, Canada, S0N 1N0

[21] Appl. No.: 417,782

[22] Filed: Sep. 13, 1982

[30] Foreign Application Priority Data

Jul. 19, 1982 [CA] Canada .................. 407549

[51] Int. Cl.³ .............................................. B65G 41/00
[52] U.S. Cl. .............................. 198/863; 414/268; 414/272
[58] Field of Search ............... 414/266–269, 414/272; 198/666, 862–865, 369, 312, 317, 318

[56] References Cited

U.S. PATENT DOCUMENTS

| 467,464 | 1/1892 | Fellows | 198/865 X |
|---|---|---|---|
| 688,912 | 12/1901 | Watts | 198/317 X |
| 1,603,838 | 10/1926 | Chambers | 198/318 X |
| 2,460,661 | 2/1949 | Tintes | 198/674 |
| 2,524,169 | 10/1950 | Hodges | 198/519 X |
| 2,741,371 | 4/1956 | Oswalt | 414/266 X |
| 3,307,684 | 3/1967 | Gilmore et al. | 198/862 |
| 4,330,232 | 5/1982 | McClaren | 414/267 |
| 4,356,910 | 11/1982 | Togstad | 198/666 X |

*Primary Examiner*—Joseph E. Valenza
*Assistant Examiner*—David A. Bucci
*Attorney, Agent, or Firm*—Harold H. Dutton, Jr.; George H. Dunsmuir

[57] ABSTRACT

An apparatus for handling (loading or unloading) grain or another granular material includes an auger which preferably is of the extendable type, rotatably mounted on the outer end of a boom, which is pivotally connected to a mast. A hydraulic piston/cylinder arrangement extends between the mast and the boom. The auger can be rotated alone with respect to the mast and boom, elevated with the boom, and rotated with the boom with respect to the mast so that one end of the auger can remain in one loading or unloading position while the other end moves from one granular material discharging or receiving position to another.

5 Claims, 1 Drawing Figure

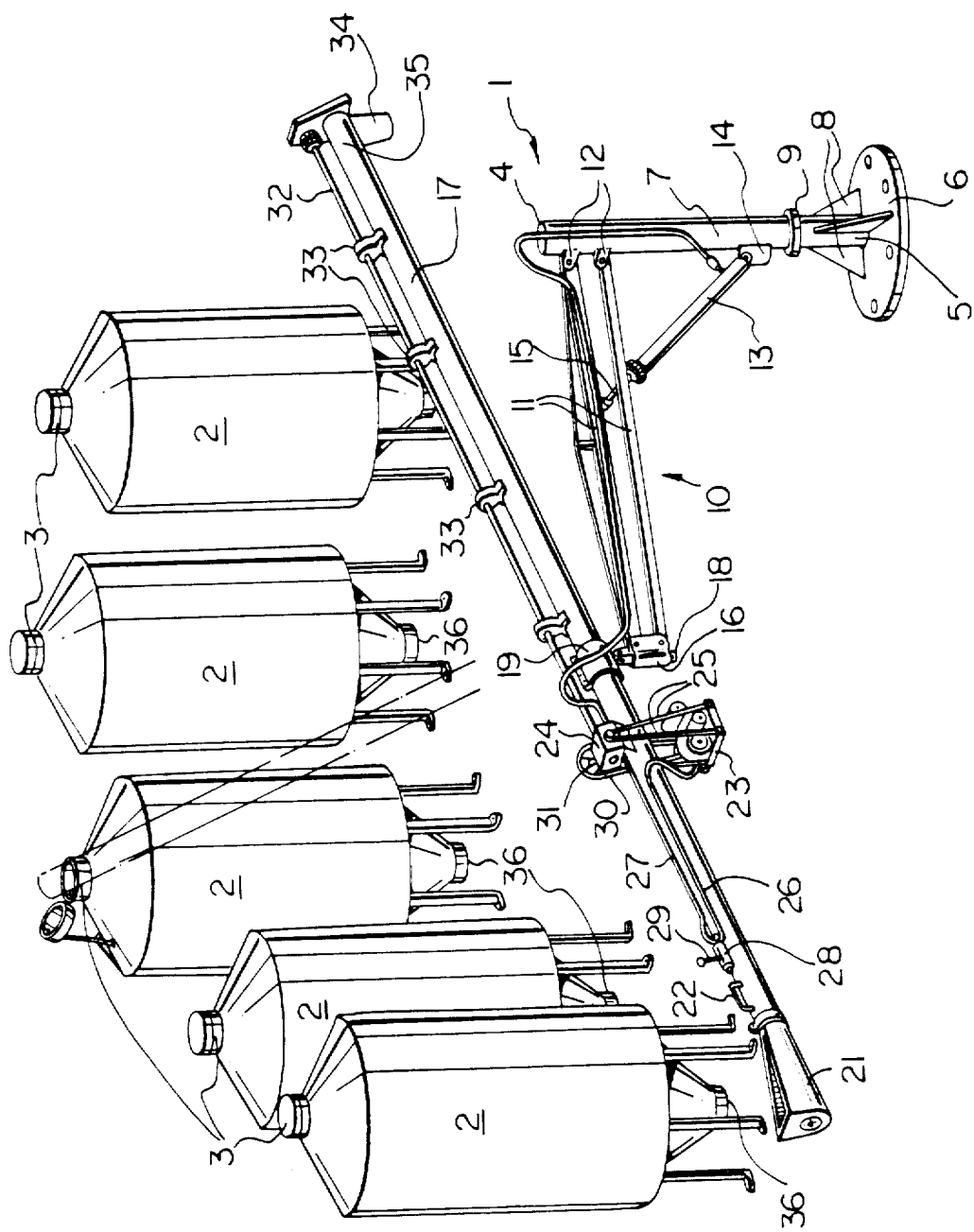

GRAIN HANDLING SYSTEM

BACKGROUND OF THE INVENTION

This invention relates to an apparatus for handling granular material, and in particular to an articulated grain handling apparatus.

Usually, grain is loaded into bins using an auger which is mounted on a frame carried by wheels. The wheels may be driven so that the auger is independently mobile, or alternatively, the wheels are not driven and the auger must be towed or pushed through a variety of terrain from one location to another. In either case, if the individual farmer has a plurality of grain bins, the loading of such bins is a time consuming and backbreaking task which generally requires more people than are available in a busy harvest season. Attempts have been made to simplify grain bin filling and emptying devices.

Examples of auger devices includes those disclosed by U.S. Pat. No. 2,460,661, issued to H. A. Tintes on Feb. 1, 1949; and U.S. Pat. No. 2,524,169, issued to L. J. Hodges on Oct. 3, 1950. The Tintes device is a fixed device, i.e., the device is intended for use in one location, and includes a tripod for supporting an auger. The Hodges elevator is somewhat similar to the Tintes device except that Hodges replaces the Tintes tripod with a movable tower. Neither of the devices in question is particularly adapted to load or unload a plurality of fixed grain bins.

The object of the present invention is to provide an apparatus for handling granular material for use with, for example, a plurality of receptacles to facilitate loading and unloading of such receptacles, i.e. to reduce loading and unloading time and effort to a minimum.

SUMMARY OF THE INVENTION

Accordingly, the present invention comprises an apparatus for handling granular material, said apparatus comprising a mast; a boom pivotally mounted on and extending horizontally outwardly from the mast; an elongated auger pivotally mounted on the outer end of the boom; the auger including an inlet end for receiving granular material and an outlet end for rotation with the boom; elevating means extending between the mast and the boom, whereby the auger can be raised or lowered with respect to the mast.

The present invention further relates to an apparatus for handling granular material for use with a plurality of receptacles, a line through the inlets or outlets of said receptacles defining an arc, said apparatus comprising a mast for mounting at a location remote from said arc; a boom pivotally mounted on and extending horizontally outwardly from said mast; an elongated auger pivotally mounted on the outer end of said boom, said auger including an inlet end for receiving granular material and an outlet end for rotation with said boom, whereby the receptacles can be loaded or unloaded in succession without moving said mast.

BRIEF DESCRIPTION OF THE DRAWINGS

The invention will now be described in greater detail with reference to the accompanying drawing, the single FIGURE of which is a perspective view from above of a preferred embodiment of granular material handling apparatus in accordance with one particular embodiment of the present invention.

For the sake of simplicity, in the following description of the preferred embodiment, the apparatus is described for handling grain only. However, it will be appreciated that the apparatus can be used to load and unload other granular materials such as fertilizer, sulphur, coal, etc.

DESCRIPTION OF THE PREFERRED EMBODIMENT(S)

With reference to the drawing, a grain handling apparatus in accordance with the present invention generally indicated at 1 is intended for loading or unloading a plurality of top loading, bottom emptying grain bins or hopper 2. The bins 2 are arranged in such a manner that the top inlets 3 thereof define an arc, i.e., a horizontal line through the centres of the inlets 3 of the bins 2 defines an arc (in this case a semicircle).

The apparatus 1 includes a mast 4 defined by a post 5 mounted on a circular base plate 6 and a sleeve 7 mounted on the post 5. Reinforcing gussets 8 extend between the post 5 and the base plate 6. A ring 9 on the post 5 supports the bottom end of the sleeve 7. Bearings (not shown) are provided between the sleeve 7 and post 5 so that the sleeve 7 is free to rotate with respect to the post 5.

A boom generally indicated at 10 is pivotally mounted on the top end of the mast 4. The boom 10 includes a pair of parallel arms 11, the inner ends of which are pivotally mounted in clevises 12 on the mast 4 for movement around horizontal axes. The bottom end of a hydraulic cylinder 13 is pivotally connected to a plate 14 on the sleeve 7 for rotation around a horizontal axis. A piston rod 15 extends out of the cylinder 13 and is pivotally connected to the upper of the two arms 11 for rotation around a horizontal axis.

A bracket 16 interconnects the outer ends of the arms 11. The bracket 16 pivotally supports a cylindrical auger casing 17 for rotation around the vertical longitudinal axis of the bracket 16. A pivot arm 18 is rotatably supported in the bracket 16, and extends upwardly to the auger casing 17. The upper end of the arm 18 is defined by a clevis for pivotally supporting the auger casing 17 for rotation around a horizontal axis. For such purpose a cylindrical bracket 19 is provided on the auger casing 17. The bracket 19 is defined by a pair of interconnected semi-cylindrical sections, which can be moved longitudinally of the auger casing 17 for balancing or altering the balance of the auger.

The auger, which may be of the extendable type, includes the casing 17, which contains a conventional auger flight (not shown). An inlet chute 21 is provided at one end of the casing 17. The chute 21 is removable so that the auger flight can be dipped directly into grain or another granular material. A handle 22 immediately above the chute 21 facilitates manual manipulation of the auger. An engine and other drive elements, including a reservoir and pump for hydraulic fluid, are mounted on a self leveling platform 23. The platform 23 is pivotally connected to a gear box 24 by arms 25, i.e., one end of each arm 25 is pivotally connected to the platform 23 and the other end of the arm 25 is pivotally connected to the gear box 24.

Hydraulic fluid from the reservoir is pumped through lines 26 and 27 and a control valve 28 to the cylinder 13. The valve 28 is operated by a lever 29, the lever and valve being mounted on the casing 17, close to the handle 22. The gear box 24 is connected to the motor by a V-belt 30 and pulley 31. A drive shaft 32 extends outwardly from the gear box 24 for driving the auger flight. The shaft 32 is supported by bearings 33 on the casing 17. A discharge spout 34 is provided on the other end 35 of the casing 17.

In operation, the inlet 3 of one of the bins 2 is opened. In this case, the central bin 2 is illustrated in the open position. The discharge spout 34 is placed in the inlet. With the auger in operation, grain or another granular material (not shown) is loaded into the chute 21 for discharge into the bin 2. When one bin 2 has been filled, the hydraulic cylinder is actuated to raise the auger, the bin is closed, and the auger casing is manually moved to position the spout 34 over the open inlet 3 of the next bin 2. The spout 34 and casing 17 are lowered with the boom 10 and the bin filling process is repeated in successive bins 2. It will be appreciated that the spout 21 can remain in one position, i.e., in a pile of grain while, by suitable manipulation of the boom 10 and casing 17, the spout 34 is placed in successive bins 2.

Of course, the arrangement can be reversed. The loading chute 21 can be inserted beneath an outlet 36 of a bin 2 for removing granular material from the bin. Again, by suitable manipulation of the boom 10 and casing 17, the chute 21 can be positioned beneath successive outlets 36 while the spout 34 remains in position over a track or rail car for loading the latter.

Thus, there has been described a relatively simple apparatus for handling granular material, which while particularly described in relation to a number of bins arranged in a semicircle is equally applicable to service grain bins arranged ot other configurations, i.e., square, rectangular or elliptical forms. Indeed, by making the apparatus portable, i.e., mounting on a vehicle, bins arranged in a straight line can be readily serviced. In larger systems, rail tracks could be utilized to advantage with vehicle mounted apparatus according to the invention.

What I claim is:

1. An apparatus for handling granular material for use in filling or emptying a plurality of receptacles from a stationary mounting position comprising a mast mounted on a support base for rotation about a first substantially vertical axis, elongated boom means connected at one end to said mast for pivotal movement about a horizontal axis, an elongated auger having an inlet and an outlet, means for connecting said auger to the other end of said mast between the inlet and the outlet of said auger, said connecting means including a vertical pivot and a horizontal pivot whereby said auger may rotate about the axis of said vertical pivot and the axis of said horizontal pivot.

2. An apparatus according to claim 1, including elevating means extending between said mast and said boom, whereby said auger can be raised or lowered with respect to said mast.

3. An apparatus according to claim 2 including platform means; pivot means pivotally mounting said platform means on said auger, whereby said platform means remains level; and drive means on said platform means for driving said auger and said elevating means.

4. An apparatus as in claim 1 and wherein said connecting means includes an auger clamping bracket movable along said auger for clamping said auger at different positions along said auger.

5. An apparatus as in claim 1 and wherein said mast comprises two substantially parallel arms, each of said arms being pivotally connected to said mast at one end and to said connecting means at the other end.

* * * * *